(12) United States Patent
Kuhl

(10) Patent No.: US 10,906,806 B2
(45) Date of Patent: Feb. 2, 2021

(54) APPARATUS AND METHOD FOR PRODUCING A SYNTHESIS GAS

(71) Applicant: CCP Technology GmbH, Munich (DE)

(72) Inventor: Olaf Kuhl, Greifswald (DE)

(73) Assignee: CAPHENIA GMBH, Bernau A. Chiemsee (DE)

( * ) Notice: Subject to any disclaimer, the term of this patent is extended or adjusted under 35 U.S.C. 154(b) by 399 days.

(21) Appl. No.: 15/570,392

(22) PCT Filed: Apr. 29, 2016

(86) PCT No.: PCT/EP2016/059620
§ 371 (c)(1),
(2) Date: Mar. 3, 2018

(87) PCT Pub. No.: WO2016/174207
PCT Pub. Date: Nov. 3, 2016

(65) Prior Publication Data
US 2018/0230008 A1     Aug. 16, 2018

(30) Foreign Application Priority Data

Apr. 30, 2015   (DE) .................. 10 2015 005 610

(51) Int. Cl.
*C01B 3/24* (2006.01)
*B01J 19/08* (2006.01)
(Continued)

(52) U.S. Cl.
CPC ............. *C01B 3/24* (2013.01); *B01J 19/088* (2013.01); *B01J 19/26* (2013.01); *C10K 3/04* (2013.01);
(Continued)

(58) Field of Classification Search
CPC ............. C01B 3/24; B01J 19/088; B01J 19/26
See application file for complete search history.

(56) References Cited

U.S. PATENT DOCUMENTS

| 2,971,822 A | 2/1961 | Williams |
| 4,141,694 A * | 2/1979 | Camacho ................ C10J 3/20 |
| | | 202/219 |

(Continued)

FOREIGN PATENT DOCUMENTS

| DE | 102013021418 | 6/2014 |
| EP | 0219163 | 10/1986 |
| WO | 2013091879 | 6/2013 |

*Primary Examiner* — Paul A Wartalowicz
(74) *Attorney, Agent, or Firm* — Tarolli, Sundheim, Covell & Tummino LLP

(57) ABSTRACT

The apparatus described herein comprises a first reaction chamber having an inlet for a hydrocarbon medium, particularly a gas having the composition $C_nH_m$, and an outlet. Means for decomposing the hydrocarbons into carbon particles and hydrogen by introducing heat are provided between the inlet and the outlet in the first reaction chamber. The apparatus also comprises a second reaction chamber having an elongated configuration and having a first inlet at one end and an outlet at the opposite end, wherein the first inlet of the second reaction chamber is connected with the outlet of the first reaction chamber, and wherein the second reaction chamber comprises a widening flow cross-section (measured perpendicular to the longitudinal dimension of the second reaction chamber) between the inlet and the outlet. In addition, at least one second inlet into the second reaction chamber is provided, wherein the second inlet can be connected to a source for $CO_2$ and/or $H_2O$. Preferably, the second inlet is connected with a source of $CO_2$, and therefore $CO_2$ is injected therewith during operation. A method for operating this apparatus is also described. The energy balance of a synthesis gas production can be improved with the apparatus and the method for operating compared with known methods.

20 Claims, 3 Drawing Sheets

(51) Int. Cl.
    *B01J 19/26*     (2006.01)
    *C10K 3/04*     (2006.01)

(52) U.S. Cl.
    CPC ............. *B01J 2219/0875* (2013.01); *C01B 2203/0272* (2013.01); *C01B 2203/0283* (2013.01); *C01B 2203/0805* (2013.01); *C01B 2203/0861* (2013.01); *C10J 2300/0969* (2013.01); *C10J 2300/0976* (2013.01)

(56) References Cited

U.S. PATENT DOCUMENTS

| | | | |
|---|---|---|---|
| 4,544,534 A * | 10/1985 | Dupin | B01J 27/053 |
| | | | 423/230 |
| 7,097,675 B2 | 8/2006 | Detering et al. | |
| 8,834,834 B2 * | 9/2014 | Paquet | C10J 3/721 |
| | | | 423/651 |
| 10,166,521 B2 | 1/2019 | Kuhl | |
| 10,287,643 B2 | 5/2019 | Kuhl | |
| 2007/0292232 A1 | 12/2007 | Plischke et al. | |
| 2007/0292321 A1 | 12/2007 | Plischke et al. | |
| 2007/0292340 A1* | 12/2007 | Plischke | B01J 19/088 |
| | | | 423/613 |
| 2011/0116979 A1* | 5/2011 | Yamamoto | C10J 3/485 |
| | | | 422/162 |
| 2013/0153826 A1 | 6/2013 | Paquet et al. | |
| 2014/0239232 A1 | 8/2014 | Staton et al. | |
| 2014/0364516 A1 | 12/2014 | Kuhl | |
| 2015/0291433 A1 | 10/2015 | Kuhl | |
| 2017/0002433 A1 | 1/2017 | Kuhl | |

\* cited by examiner

APPARATUS AND METHOD FOR PRODUCING A SYNTHESIS GAS

This application corresponds to PCT/EP2016/059620, filed Apr. 26, 2016, which claims the benefit of German Application No. 10 2015 005 610.7, fled Apr. 30, 2015, the subject matter of which are incorporated herein by reference in their entirety.

BACKGROUND OF THE INVENTION

The following invention concerns an apparatus and a method for producing a synthesis gas.

DE 10 2012 015314 A1, which is assigned to the applicant of the present application, describes among others an apparatus and a method for producing a synthesis gas. In the method disclosed therein, at first a hydrocarbon medium is decomposed by introducing heat, especially by applying a plasma. Said decomposition is carried out in a first reaction chamber. An aerosol of carbon particles and hydrogen produced thereby is transferred, without significant cooling, into a second reaction chamber, into which additional $CO_2$ is supplied.

The carbon particles and the $CO_2$ are converted into carbon monoxide (CO) inside the second reaction chamber, which is described as a simple pipe in one example. According to DE 10 2012 015314 A1, a stoichiometric ratio of carbon particles and $CO_2$ should be provided in the second reaction chamber, wherein further the second reaction chamber is preferably maintained at a temperature of approximately 1000° C. in order to force the conversion, which is an equilibrium reaction, into the direction of CO. Therefore, the CO that exits the second reaction chamber, has usually a temperature of more than 800° C. and the temperature is usually between 800° C. and 1000° C.

SUMMARY OF THE INVENTION

It is the object of the invention to improve the energy balance of a corresponding production of synthesis gas and to possibly enable a lower temperature at the end of the conversion of carbon particles into carbon monoxide.

According to the invention this object is achieved by an apparatus for producing a synthesis gas according to claim 1 as well as a method for producing a synthesis gas according to claim 12.

In particular, the apparatus comprises a first reaction chamber having an inlet for a hydrocarbon medium, especially a gas having the composition $C_nH_m$, and an outlet. Means for decomposing the hydrocarbon into carbon and hydrogen by introduction of heat are provided in the first reaction chamber. The apparatus also comprises a second reaction chamber that has an elongated configuration and comprises a first inlet at one end and an outlet at the opposite end, wherein the first inlet of the second reaction chamber is connected to the outlet of the first reaction chamber and wherein the second reaction chamber has a flow cross-section that increases between inlet and outlet (when measured perpendicular to the longitudinal direction of the second reaction chamber). Further, at least one second inlet into the second reaction chamber is provided, wherein the second inlet can be connected to a source for $CO_2$ and/or water. It is preferred to connect the second inlet with a source for $CO_2$, and therefore $CO_2$ is injected thereby during operation.

This configuration enables that the carbon particles, which leave the first reaction chamber with a high temperature, at first react with $CO_2$ according to the Boudouard reaction so as to form CO and/or that the carbon particles can react with $H_2O$ according to a heterogeneous water gas shift reaction so as to form CO and $H_2$. An increasing volume of CO or synthesis gas (i.e. CO and $H_2$) is formed by ongoing conversion of carbon particles with the respective gases $CO_2$ and/or $H_2O$. The increasing volume of CO or synthesis gas can be accommodated due to the enlarging second reaction chamber. This can counteract a pressure increase inside the second reaction chamber. Therefore, a respective conversion reaction (i.e. Boudouard reaction or heterogeneous water gas shift reaction) does not have to work against an increase of pressure.

In another embodiment, at least one third inlet into the second reaction chamber is provided, wherein the third inlet can be connected to a source for $H_2O$ vapour and/or $CO_2$. In longitudinal direction of the second reaction chamber, the second inlet is located preferentially between the first and the third inlet. Preferentially, the third inlet is connected to a source for $H_2O$, and therefore $H_2O$ is injected therewith. With this configuration, carbon particles that did not react with $CO_2$ can subsequently be converted with $H_2O$-steam into CO and hydrogen according to the known heterogeneous water gas shift reaction (also known as hetWGS-reaction). The Boudouard reaction is slower compared to hetWGS and usually requires higher temperatures, so that the Boudouard reaction can occur before the hetWGS in flow direction of reacting media or reactants. The sequence of a Boudouard reaction followed by a hetWGS reaction further allows that the synthesis gas exiting the second reaction chamber may have a lower temperature than it is the case in the method according to the above mentioned DE 10 2012 015314 A1. Amongst other reasons, this results from the fact that the hetWGS is still possible at lower temperatures. Instead of the above sequence of introducing the reactants, i.e. $CO_2$ upstream from the $H_2O$-steam, it is also possible to (a) inject both reactants simultaneously through the second inlet or (b) inject the $H_2O$-steam upstream with respect to the $CO_2$, even if the above mentioned sequence is preferred.

According to one embodiment, the second method chamber has a flow cross-section at the exit which is enlarged by at least 20% compared to the inlet. This accommodates the increase in volume during the conversion of carbon particles with the respective gases $CO_2$ and/or $H_2O$. In particular, the second reaction chamber can widen conically in order to provide a continuous and smooth enlargement of the flow cross-section. It would also be possible to provide a stepwise enlargement or, for example, two different conical enlargements. For example, a first conical enlargement can be provided downstream of the second inlet and a second conical enlargement with a greater conical angle can be provided downstream of the third inlet in order to accommodate a possible stronger increase in volume due to a faster reaction in the region of a hetWGS-reaction.

Preferably, the means for decomposing hydrocarbons are adapted to heat the carbon particles and the hydrogen from the decomposition in such a way that they reach a temperature of greater than 1200° C., in particular greater than 1600° C., at the inlet to the second reaction chamber. Hereby the energy required for conversion can be primarily provided by the carbon particles.

In order to have a good benefit from the length of the second reaction chamber, the at least one second inlet into the second reaction chamber is located, measured from the first inlet, in the first third and in particular the first quarter of the longitudinal dimension of the second reaction chamber. It is preferred to have the at least one second inlet as close as possible to the first inlet of the second reaction chamber. The at least one third inlet into the second reaction chamber is located in the second half, particularly in the last third, of the longitudinal dimension of the second reaction chamber, again measured from the first inlet, so as to allow for sufficient time for the Boudouard reaction between $CO_2$ and the carbon particles. Here, it is taken into account that the Boudouard reaction is significantly slower compared to the hetWGS reaction. Therefore, it is also possible to inject the steam through the at least one third inlet shortly before the end of the second reaction chamber. This is particularly advantageous for the embodiment wherein $CO_2$ is introduced through the second inlet.

Therefore the $CO_2$ should be introduced into the second reaction chamber as close as possible to the inlet, whereas the steam should be introduced so close to the end of the second reaction chamber that there is just sufficient time left to perform the conversion of residual carbon particles according to the hetWGS reaction, and possibly further Boudouard reactions.

A plurality of second and third inlets, respectively, are provided that are spaced at least in longitudinal direction of the second reaction chamber in order to effect a good distribution of the process gases. In particular, a plurality of second and third inlets can be provided also circumferentially, wherein these inlets are for instance aligned in a way that they do not point towards the centre of the second reaction chamber, but inject the gas also in circumferential direction. This results in a good mixing and turbulence of the various components.

In one embodiment at least one heating unit is provided that is adapted to heat the second reaction chamber and that is located, along the longitudinal dimension of the second reaction chamber, between the at least one second inlet and the at least one third inlet.

The Boudouard reaction is an endothermic reaction so that the temperature decreases along the second reaction chamber (starting from the first inlet). So as not to let the temperature drop below a predetermined value, the area between the at least second inlet and the at least third inlet can be actively heated.

According to another embodiment, at least one heating unit is provided for heating $CO_2$ and $H_2O$ before these are injected into the second reaction chamber through the second or third inlets, wherein the heating unit is adapted to heat the respective medium ($CO_2$ or $H_2O$) to a temperature of at least 1000° C. Such heating of the substances ensures a sufficient temperature for the respective reaction. Further, such heating can enable a lower inlet temperature of carbon particles and hydrogen.

According to the method for producing a synthesis gas, at first a hydrocarbon medium, especially a gas having the composition $C_nH_m$, is decomposed into carbon particles and hydrogen by supply of heat in a first reaction chamber. Subsequently, at least the carbon particles, but preferably an aerosol of carbon particles and hydrogen, are/is transferred to a second reaction chamber that has an elongate configuration having a first inlet at one end and an outlet at the opposite end. Here, the first inlet of the second reaction chamber is connected with the outlet of the first reaction chamber, and the flow cross-section of the second reaction chamber increases between the first inlet and the outlet. Further, $CO_2$ and/or $H_2O$ are injected into the second reaction chamber in proximity to the inlet end of the second reaction chamber, that is in a region closer to the inlet end than to the outlet end, in order to mix at least the carbon particles with $CO_2$ and/or $H_2O$. At the beginning, the mixture of carbon particles (optionally with hydrogen) and $CO_2$ and/or $H_2O$ has a temperature of at least 1000° C., preferably of at least 1400° C. If only $CO_2$ is injected, then at least a portion of the carbon particles and the $CO_2$ in this mixture is converted into CO according to the Boudouard reaction. If only $H_2O$ is injected, then at least a portion of the carbon particles and the $H_2O$ are converted into synthesis gas according to the heterogeneous water gas shift reaction. If $CO_2$ and $H_2O$ are injected, then the Boudouard and the heterogeneous water gas shift reaction take place.

Due to a corresponding enlargement of the second reaction chamber, volume dependent pressure increases are prevented or at least mitigated in order to not work against the conversion of carbon particles with the respective gases.

In a preferred embodiment, at first $CO_2$ is injected at a location near the first inlet, and then $H_2O$ steam is injected into the second reaction chamber downstream of the $CO_2$ inlet, and at least a portion of the residual carbon particles and of the $H_2O$ steam are converted into CO and $H_2$ according to the hetWGS-reaction. Such a two-stage injection of $CO_2$ and $H_2O$ steam, especially if these are present in excess, enables a good and essentially complete conversion of the carbon particles as well as a reduced temperature at the outlet of the second reaction chamber, which can be 500-600° C. for instance.

According to one embodiment of the invention, the carbon particles and the hydrogen produced during the decomposition are transferred conjointly in form of an aerosol and having a temperature of greater than 1200° C., especially greater 1400° C., into the second method chamber. In this case, the separation of carbon particles and hydrogen is dispensed with, and the high temperature of the carbon particles ensures that a sufficient temperature is provided for the conversion. It needs to be considered that the carbon particles consist of a multitude of carbon atoms that are removed from the outside by the reaction with $CO_2$ starting with the atoms at the surface. In this process, the carbon particle gains heat, whereas the CO that is formed cools down. Therefore, the carbon particles can retain their temperature level throughout long regions of the second reaction chamber, while they release atoms at the surface. Although the total heat decreases, the temperature of the carbon particles can remain sufficiently high even during ongoing conversion so that they can react with colder $CO_2$ or $H_2O$ even at the end of the conversion. It can therefore be of advantage to begin with a relatively high temperature of the aerosol. In addition, the hydrogen from the feedstock hydrocarbon is available for the $CO/H_2$-ratio of the synthesis gas.

Preferentially, the injection of $CO_2$ and/or $H_2O$ occurs, starting at the first inlet, in the first third, especially in the first quarter, of the longitudinal dimension of the second reaction chamber. Especially if only $CO_2$ is injected, the $CO_2$ should be injected as close as possible to the first inlet in order to provide enough reaction time for the Boudouard reaction. Alternatively, an injection through inlets that are spaced along the longitudinal dimension of the second reaction chamber can be advantageous in order to effect a good mixing of the reactants (carbon particles and $CO_2$).

It is preferred to regulate the amount of injected $CO_2$ relative to the amount of previously generated carbon particles. Based upon whether the injected $CO_2$ is converted totally or only partially to a certain percentage, it can be adjusted how much carbon particles are available for conversion with $H_2O$ steam. Thereby, the hydrogen content in the synthesis gas can be adjusted, wherein the hydrogen from the decomposition in the first reaction chamber and also the hydrogen from the conversion according to the hetWGS reaction has to be taken into account.

In order to ensure a good conversion of the $CO_2$ according to the Boudouard reaction, the second reaction chamber can be heated in at least one region that is located between the inlet for $CO_2$ and the inlet for $H_2O$ in the longitudinal dimension of the second reaction chamber. Here, the second reaction chamber is preferentially heated to at least 800° C. Such heating can be omitted, however, if for instance the carbon particles (possibly mixed with $H_2$) and the $CO_2$ have sufficiently high temperatures upon entering the second reaction chamber.

According to a further embodiment it is arranged that at least one of the $CO_2$ and the $H_2O$ steam is heated to a temperature of at least 1000° C. or preferentially at least 1400° C. before entering the second reaction chamber.

Above, devices have described, wherein the second reaction chamber comprises an inlet having an increasing flow cross-section (measured perpendicular to the longitudinal dimension of the second reaction chamber). The above described methods were carried out with a second reaction chamber having an increasing flow cross-section. However, also an alternative apparatus is considered, in which the second reaction chamber has any other form, especially a constant flow cross-section. In this alternative apparatus, the second reaction chamber has a second inlet and a third inlet. The second inlet can be connected with a source of at least $CO_2$ and third inlet can be connected with a source for $H_2O$. The second and third inlets are positioned as described above. During operation, $CO_2$ (and optionally a small amount of $H_2O$) is injected through the second inlet, and $H_2O$ is injected downstream thereof through the third inlet. All other features of the apparatus and the method correspond to the above described embodiments. By means of this alternative apparatus and method, the energy balance of the synthesis gas production is likewise improved, and a lower temperature at the end of the conversion of the carbon particles into carbon monoxide is possible. In addition, the composition of the synthesis gas may be easily modified by regulating the injected amount of $CO_2$.

BRIEF DESCRIPTION OF THE DRAWINGS

In the following, the invention is described in more detail with reference to the drawings; in the drawings.

DESCRIPTION

Figure 1:
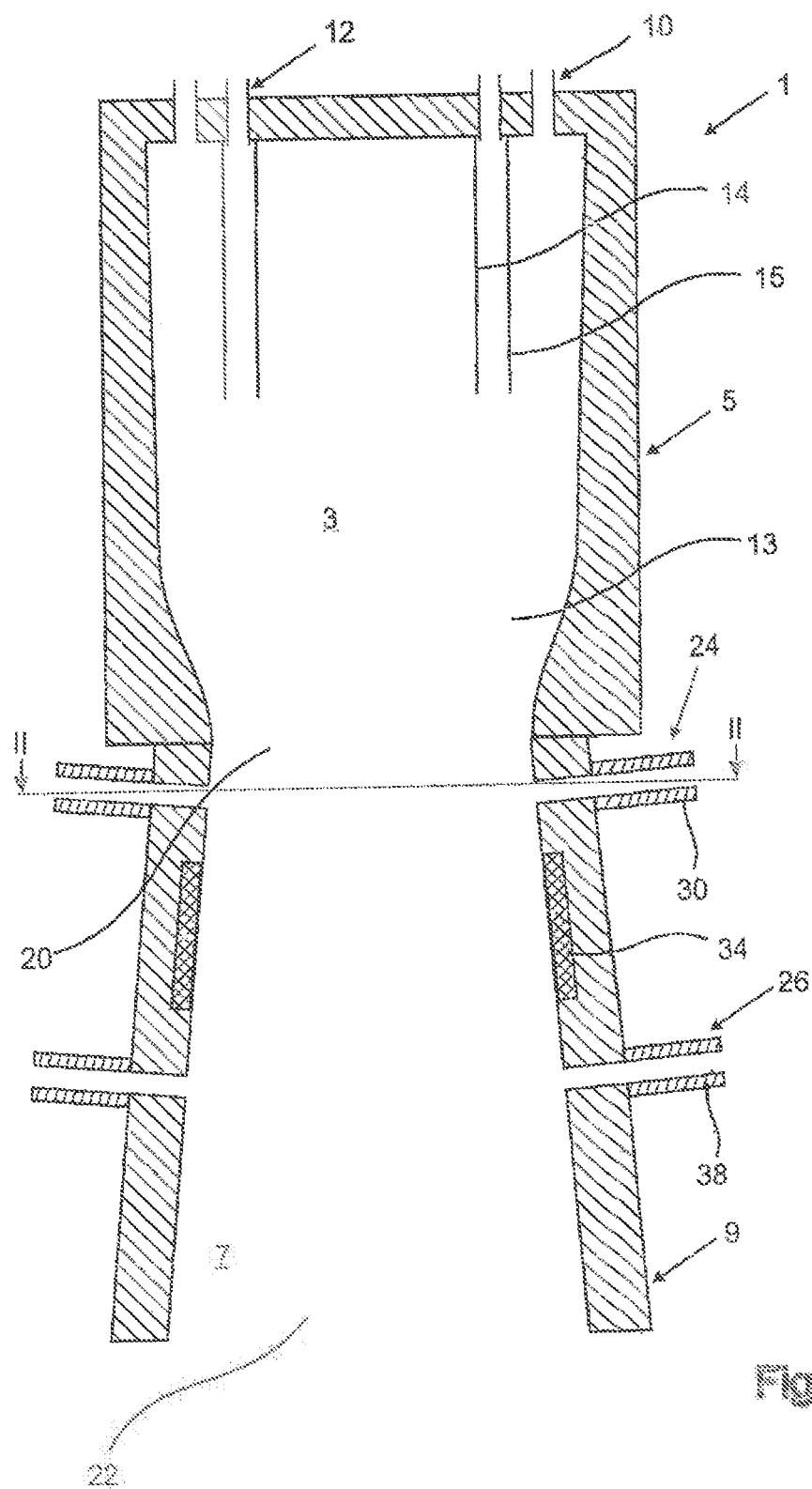
FIG. 1 is a schematic cross-sectional view of an apparatus for producing a synthesis gas.

Terms used in the description like above, below, left and right relate to the description in the drawings and shall not be limiting. But these terms can describe preferred embodiments. The term essentially with respect to parallel, perpendicular or angles shall include deviations of +/−3 degrees.

Figure 2:
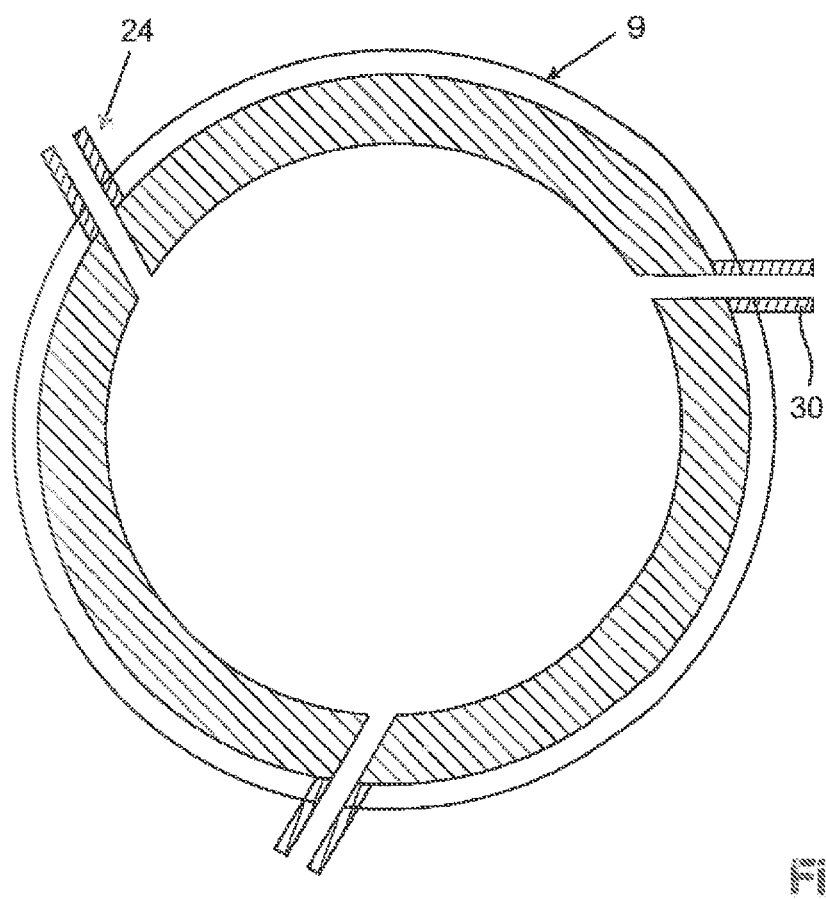
FIG. 2 is a schematic cross-sectional view along line II-II in FIG. 1.
Figure 3:
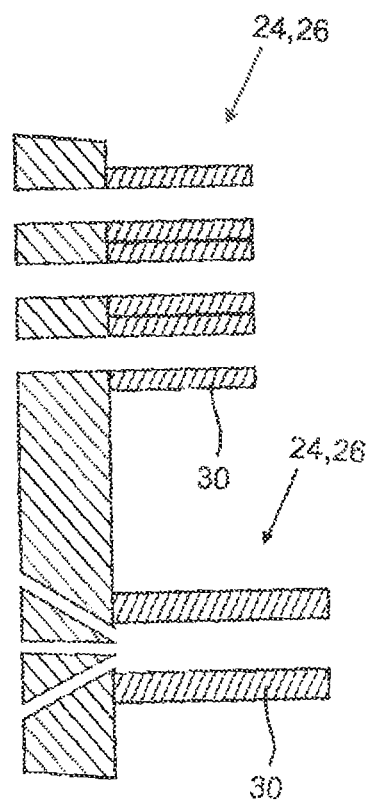
FIG. 3 is a schematic detailed cross-sectional view of the inlet area for process gases.

In the following, a schematic structure of an apparatus 1 for producing a synthesis gas is described in more detail with reference to FIGS. 1 to 3, wherein FIG. 1 depicts a schematic cross-sectional view of apparatus 1 for producing a synthesis gas. FIG. 2 depicts a schematic cross-sectional view of apparatus 1 along the line II-II in FIG. 1, wherein a special gas injection configuration is shown that is not consistent with the depiction according to FIG. 1. FIG. 3 depicts an enlarged sectoral cross-sectional view of various embodiments of a gas injection region of apparatus 1.

The apparatus 1 consists essentially of a first reaction chamber 3 surrounded by an insulating case 5 as well as a second reaction chamber 7 surrounded by an insulating case 9.

A plurality of first inlets 10 and a plurality of second inlets 12 is formed in the case 5 surrounding the first reaction chamber 3. The inlets 10 and 12 are provided in an upper wall of case 5. The inlets 10 are arranged on a first imaginary circular line and the inlets 12 are arranged on a second imaginary circular line. The two circular lines are concentric to each other. But it is also possible to provide a different arrangement of the first and second inlets 10 and 12. In particular, it is also possible to provide only one inlet 10, which may be circumferential for instance, or one circumferential inlet 12, respectively. The inlets 12 are located further inside.

The case 5 further comprises an outlet 13 located at the bottom. As can be seen in FIG. 1, the case 5 can comprise a tapering in the lower part of the reaction chamber 3. But it is also possible that such a tapering is not provided, and then the case 5 has a cross-section essentially like an upside-down U.

Two circular electrodes 14, 15, which are concentric to each other, are disposed inside the reaction chamber 3, wherein the electrodes are connected to an electric power supply by means of connecting elements (not shown). Here, the electrode 14 is located concentrically inside the electrode 15. The electrodes 14, 15 are attached to an upper wall of the case 5 in such a way that they extend downward. The inlets 12 are aligned with the electrodes 14, 15 such that they open in the space between the electrodes 14, 15. The outlet openings 10 are aligned with respect to the electrodes 14, 15 such that they open towards a region between the outer electrode 15 and a sidewall of the case 5. Alternatively, rod-shaped electrodes can be used.

The second inlets 12 are suitably connected to a source of gas for injecting a plasma gas. Every suitable gas may be selected as plasma gas, which is supplied by an external source or is produced within the hydrocarbon converter. Inert gases, for instance argon or nitrogen, are a suitable plasma gas. On the other hand, hydrogen, CO or synthesis gas may be used as these gases are generated within the present apparatus. The electrodes 14, 15 and the electric power supply connected therewith are coordinated in such a way that when a voltage is applied between electrodes 14, 15 and a plasma gas is injected via the second inlets 12, a plasma is initially formed between the electrodes and can be maintained. In particular, the adjustment can be such that a plasma will burn beyond the free ends of the electrodes 14, 15.

The inlets 10 are connected to a source for a hydrocarbon medium, particularly a gas having the composition $C_nH_m$. The medium injected through inlets 10 essentially forms a curtain or a layer of gas flowing between the outer electrode 15 and the sidewall of the case 5 in order to shield the sidewall against high temperatures that are generated by the plasma. In addition, the medium absorbs heat and will be decomposed into its base elements by input of heat from the plasma on the medium's way from the second inlet 10 towards the lower outlet 13 of case 5. That means that the medium that is injected through inlets 10, has been decomposed into carbon particles and hydrogen, when it exits through outlet 13 of the first reaction chamber.

The second reaction chamber 7 is essentially shaped like a pipe that widens conically from a first end proximate to the first method chamber 3 to a second end. The second reaction chamber 7 is confined by the case 9 which defines a corresponding conical form. However, a corresponding enlargement can also be provided in a stepwise manner or in another continuous or discontinuous way. Therefore, the process chamber 7 comprises a first inlet 20 that essentially corresponds in form and flow cross-section to outlet 13 of the first reaction chamber and is in direct vicinity thereto. At the other end, a respective outlet 22 is formed.

In the insulating case 9, which has a respective conically enlarging form, a multitude of second gas inlets 24 and third gas inlets 26 are provided.

The second gas inlets 24 are essentially in close proximity to the first inlet 20 of reaction chamber 7, preferably in the first third, especially in the first quarter of the longitudinal dimension of the second reaction chamber measured from the first inlet 20. The second gas inlets 24 can be oriented radially towards the interior and towards the longitudinal axis of the reaction chamber 7 or they may extend at an angle towards the interior of reaction chamber 7 as indicated in FIG. 2. An injection at an angle, as depicted in FIG. 2, results in a circular flow component (perpendicular to the longitudinal axis) of the gas injected by the inlets 24 within the first reaction chamber 7.

The second inlets 24 are connected with a source for $CO_2$ gas. In particular, the source for $CO_2$ gas can be the exhaust gases of an industrial method. The respective exhaust gases may have been cleaned an/or filtered in order to provide pure $CO_2$. For instance, the $CO_2$ can be frozen out of a respective exhaust gas stream, wherein usually water will be frozen out together with the $CO_2$ such that not only $CO_2$ but also water can be injected through the second inlets 24.

In the supply or injection region, the second inlets 24 can be surrounded by a heating device 30 which is adapted to heat the media injected via the respective second inlet 24 to a default temperature. In particular, it is considered to heat the $CO_2$ (and possibly water) which is (are) injected through the second inlets 24 to a temperature of more than 1000° C. The heating device 30 should be designed accordingly. But it is also possible to use another heating unit that can provide respective pre-heating instead of heating device 30. It is considered to heat the $CO_2$ (and possibly water) by means of waste heat from the first reaction chamber 3. In this way, the case 5 of the first reaction chamber 3 can be protected from overheating.

The third inlets 26 are located further away from inlet 20 in the longitudinal dimension of reaction chamber 7 than the second inlets 24. In particular, the third inlets 26 are located in the second half, and especially in the last third, of the reaction chamber 7 with respect to the longitudinal dimension of the reaction chamber 7. The third inlets 26 can essentially have the same configuration as the second inlets 24, and they can comprise the same heating device 30 in order to facilitate pre-heating of the medium injected therewith. The third inlets 26 are connected to a source of water or steam, respectively.

A heating unit 34 is provided in a region between the second inlets 24 and the third inlets 26 in the insulating case 9, wherein the heating unit 34 faces the second reaction chamber 7. The heating unit 34 is designed in such a way that it is able to heat the reaction chamber 7 and the substances contained therein to a temperature of at least 800° C., preferably 1000° C. or to maintain this temperature, respectively.

Although a plurality of second and third inlets 24 and 26, respectively, are depicted in FIG. 1 and FIG. 2, wherein the inlets are located in the same plane, it is possible to provide only one inlet which may have different forms. As indicated in FIG. 3, it is also possible to provide several second inlets 24 or third inlets 26 that are spaced in the longitudinal direction of the reaction chamber 7. The inlets 24, 26 can have different forms, wherein FIG. 3 shows two different forms. In the embodiment shown above, three inlets 24 and 26, respectively, are spaced in longitudinal direction along reaction chamber 7, wherein each has a separate feeding line, and optionally has a heating device 30.

In the embodiment shown below, only one feeder having a heating device 30 is provided, and the inlets 24 and 26, respectively, that are spaced in longitudinal direction along reaction chamber 7 are formed by an angled bore through a sidewall of case 9.

In the following, the operation of apparatus 1 is further described referring to the Figures.

A plasma gas, for instance argon, nitrogen, hydrogen $H_2$, CO or synthesis gas, is injected through the second inlets 12 into the first reaction chamber 3 into the space between the ring electrodes 14, 15. A voltage is applied between the electrodes 14, 15, such that the plasma gas ignites and a plasma is generated. The plasma burns in the space between the electrodes 14, 15 and beyond the free ends.

For instance a methane gas ($CH_4$) is injected through the first inlets 10 into the annular space between outer electrode 15 and the sidewall of case 5. While flowing in the direction of outlet 13 of the first reaction chamber 3, the methane gas is heated. Thereby it is heated that much that it decomposes into its base elements carbon and hydrogen. These form an aerosol that exits the first reaction chamber 3 through outlet 13. This aerosol also contains components of the plasma gas that are neglected in the following.

The feeding rate of the plasma gas, the voltage between electrodes 14, 15 and the feeding rate of the methane are adjusted with respect to each other such that the methane is fully decomposed and the generated aerosol of carbon and hydrogen has a temperature over 1000° C., particularly over 1200° C., preferably over 1400° C. when exiting through the outlet 13 of the first reaction chamber 3. Further, the process parameters will be adjusted such that the generated carbon particles preferably have a size in the range from 1 to 500 nm, particularly from 5 to 200 nm and preferably from 10 to 100 nm. The particles can occur as single particles or as clusters that decompose to single particles shortly after conversion begins.

The aerosol enters the second reaction chamber 7 via the inlet 20 and is there mixed with $CO_2$ that is injected into the second reaction chamber through inlets 24. Here, the temperature of the $CO_2$ is adjusted with respect to the aerosol temperature in such a way that the mixture has a temperature of at least 1000° C., preferably of at least 1200° C. In the resulting mixture, the carbon particles in the aerosol are converted into CO (carbon monoxide) in a reaction with $CO_2$. The carbon particles that initially loose carbon atoms at the surface, gain heat in this method. The $CO_2$ gas, however, cools down during this conversion into CO.

A corresponding conversion of carbon particles and $CO_2$ into CO is also known as Boudouard reaction ($CO_2+C->2$ CO). The reaction proceeds while the reactants flow along the second reaction chamber 7. Optionally, the area downstream of the second inlets 24 can be kept at a predetermined temperature level using a heating unit 34.

The feeding of $CO_2$ through the second inlets 24 is preferably controlled in such a way that the entire $CO_2$ or a certain percentage thereof is converted, but not the entire carbon particles. With other words, $CO_2$ can be added sub-stoichiometric.

Steam (H₂O steam) is injected through the third inlets 26 into the second reaction chamber 7 downstream from the second inlets 24. The steam and residual $CO_2$ react with the residual carbon particles. The conversion of carbon particles and $H_2O$ steam proceeds according to the so-called heterogeneous water gas shift reaction (hetWGS-reaction). This reaction is significantly faster than the Boudouard reaction and can proceed at lower temperatures, wherein the temperature should preferably be above 550° C.

The aim is an essentially complete conversion of the carbon particles. At the outlet 22 of the second reaction chamber 7, the carbon particles should essentially be converted completely, wherein "essentially" means a conversion of at least 90%, preferably at least 95%. Thus, a synthesis gas consisting of a mixture of CO and hydrogen exits through outlet 22, wherein this synthesis gas may contain additionally $CO_2$ and steam as well as small unconverted carbon particles. Overall, feeding of the reactants should be controlled such that the unconverted components remain below predetermined thresholds, so that they do not interfere with their further processing in for instance a Fischer-Tropsch synthesis. Corresponding adjustments can be performed by the person skilled in the art according to the above disclosure.

As described above, the reaction chamber 7 has a conical pipe shape that widens from the first inlet 20 to the outlet 22. The form is chosen such that the outlet end has an at least 20% larger cross-section than the inlet end. Preferably, the increase of the flow cross-section is between 20 and 25%.

While the operation of the method has been described above with reference to the Figures, further considerations on which the present invention are based are given in the following.

The basic equation of the conversion reaction in the second reaction chamber starting from $CH_4$ as feed gas in the first reaction chamber 3 is:

$$3C+6H_2+CO_2+2H_2O \rightarrow 4CO+8H_2,$$

wherein a stoichiometric ratio of the reactants in a certain relation to each other is assumed.

Accordingly, the number of particles doubles as the proceeds reaction, and the reaction is endothermic. From the general gas equation $pV = nRT$ follows therefore an increase in pressure in a closed system, assuming a constant temperature that can be kept constant using an external heating unit.

If an external heating unit is dispensed with, the temperature decreases in the course of the reaction along the second reaction chamber, and the increase in pressure decreases. With the conical enlargement of the second reaction chamber, the increase in pressure can essentially be avoided or at least reduced, despite an increase in volume, so that the reaction has to work less against an outer pressure. In the present system, a constant temperature within the second reaction chamber is dispensed with, although additional heating can be provided by heating unit 34 in an intermediate region.

The conical design of the second reaction chamber 7 compensates at least partially for an increase in volume that cannot be offset by the decrease in temperature along the second reaction chamber 7.

In the following, two specific examples are given for a method, wherein methane ($CH_4$) is used as input or starting gas for the first reaction chamber 3. The temperature of the aerosol generated by the decomposition of $CH_4$ is 2100° C. at the outlet 13, and the temperature of the synthesis gas at the outlet is 1000° C. In a first stage of the second reaction chamber 7, i.e. between the inlet 20 and the inlets 26, 600 units of the aerosol (of carbon particles and hydrogen) and 100 units of $CO_2$ (1600° C.) are converted into 800 units of fluid. Thereby, the temperature decreases from 2100° C. to 1660° C. In a second stage, i.e. downstream of the inlets 26, 800 units of the fluid are converted with 200 units of steam (1600° C.) into 1200 units of synthesis gas. Thereby, the temperature decreases from 1660° C. to 1000° C. This results in:

| Stage I: | $\Delta T = -1/6$ | $\Delta V = +1/3$ | $\Delta p = +1/6$ |
| --- | --- | --- | --- |
| Stage II: | $\Delta T = -1/3$ | $\Delta V = +1/2$ | $\Delta p = +1/6$ |
| Total: | $\Delta T = -1/2$ | $\Delta V = +1$ | $\Delta p = +1/2$ |

Therein $\Delta T$ refers to the decrease in temperature, $\Delta V$ refers to the increase in volume, and $\Delta p$ refers to the increase in pressure.

In a second example, the temperature of the aerosol is 1600° C., and the temperature of the exiting synthesis gas is 500° C. In the first stage, 600 units of the aerosol and 100 units of $CO_2$ (1600° C.) are converted into 800 units fluid. Thereby, the temperature decreases from 1600° C. to 1080° C. In the second stage, 800 units of the fluid and 200 units of steam (1600° C.) are converted into 1200 units of synthesis gas. The temperature decreases from 1080° C. to 500° C. This results in:

| Stage I: | $\Delta T = -1/4$ | $\Delta V = +1/3$ | $\Delta p = +1/12$ |
| --- | --- | --- | --- |
| Stage II: | $\Delta T = -2/5$ | $\Delta V = +1/2$ | $\Delta p = +1/10$ |
| Total: | $\Delta T = -3/5$ | $\Delta V = +1$ | $\Delta p = +2/5$ |

With a lower starting temperature of the aerosol and thus a simultaneously lower exit temperature of the synthesis gas, the pressure increase that needs to be compensated is also lower. The required enlargement of the pipe is given by the equation for the cross-section area $A=\pi r^2$ as a factor 1.18 (for $p_2=1.4\ p_1$) and as a factor 1.22 (for $p_2=1.5\ p_1$).

The compensation of the increase in volume avoids the Principle of Le Chatelier, and the reaction no longer has to perform work against the outer pressure.

Because of the method above described, heating the second reaction chamber 7 to a constant temperature can be dispensed with, although it can be advantageous to have an additional heating unit for an intermediate region. As a consequence, the exit temperature of the synthesis gas can be made lower than 500° C. and is no longer at 800-1000° C. as with a classic Boudouard reactor as mentioned in the prior art. The corresponding heating energy may be saved.

The reaction gases $CO_2$ and $H_2O$ can be injected stoichiometric with respect to the carbon particles, wherein however both gases (in total) are used preferably in 10-30% excess. The unconverted reaction gases can be frozen out after the reaction and can be, if appropriate, re-injected into the second reaction chamber. Even if a portion of the synthesis gas is also frozen out, it will not get lost this way. Residual $CO_2$ and $H_2O$ in the synthesis gas are no hindrance in, for instance, a Fischer-Tropsch method, if certain limits are observed.

However, an excess of carbon particles would reduce the synthesis gas yield and is not economical. Therefore, an excess of $CO_2$ and/or $H_2O$ is preferred.

The $H_2/CO$ ratio of the synthesis gas can be adjusted by changing the amount of injected $CO_2$ with respect to the added carbon particles. The more $CO_2$ is injected, the lower is the relative $H_2$ content in the synthesis gas, and the higher is the amount of CO.

The reaction gases $CO_2$ and $H_2O$ can be preheated before being injected into the second reaction chamber. Preheating to a temperature range between 1400 and 1600° C. is considered. Thus, the exit temperature of the aerosol at the outlet of the first reaction chamber can be lowered, for instance to a temperature range between 1200 and 1400° C.

The invention has been described in detail with respect to a specific embodiment without being limited to any specific embodiment. In particular, the design of the first reaction chamber can differ from the design described herein. In particular, the design, arrangement and number of the electrodes can change, and the inlet for hydrocarbons can be arranged differently. In addition, it is not necessary that the decomposition of the starting material is effected with the aid of a plasma. The arrangement and number of the second and third inlets with respect to the second reaction chamber can also differ from the described arrangement and number.

As mentioned above, it is considered that the second reaction chamber has any other form, in particular a constant flow cross-section. In this alternative apparatus, the second reaction chamber has a second and a third inlet that are arranged in the way described above. In operation, $CO_2$ (and optionally a small amount of $H_2O$) is injected via the second inlet, and $H_2O$ is injected downstream via the third inlet. All other features of this apparatus and method correspond to the above described statements.

The invention claimed is:

1. Apparatus for producing a synthesis gas comprising the following:
    a source for a hydrocarbon medium;
    a source for $CO_2$;
    a source for $H_2O$;
    a source for plasma gas;
    a first reaction chamber having first and second inlets and an outlet, wherein the first inlet of the first reaction chamber is connected to the source for a hydrocarbon medium, and the second inlet of the first reaction chamber is connected to the source for plasma gas;
    an electric power supply and at least two electrodes connected to the electric power supply, the at least two electrodes being located in the first reaction chamber between the second inlet and the outlet of the first reaction chamber, the electric power supply and at least two electrodes being configured to decompose the hydrocarbon medium into carbon particles and hydrogen by introducing heat;
    a second reaction chamber having an elongated configuration and having a first inlet at one end and an outlet at the opposite end, wherein the first inlet of the second reaction chamber is connected with the outlet of the first reaction chamber, and wherein the second reaction chamber comprises an enlarging flow cross-section between the inlet and the outlet;
    the second reaction chamber comprising at least one second inlet connected to the source for $CO_2$;
    the second reaction chamber comprising at least one third inlet connected to the source for $H_2O$; and
    wherein the second inlet of the second reaction chamber is located in a longitudinal direction of the second reaction chamber between the first and third inlets of the second reaction chamber.

2. Apparatus according to claim 1, wherein the second reaction chamber has a flow cross-section at the outlet end which is at least 20% wider than at the inlet end.

3. Apparatus according to claim 1, wherein the second reaction chamber does not comprise a substantial decrease in flow cross-section between the inlet and the outlet.

4. Apparatus according to claim 1, wherein the second reaction chamber widens conically.

5. Apparatus according to claim 1, wherein the means for decomposing the hydrocarbons are adapted to heat the carbon particles and the hydrogen generated by the decomposition such that they have a temperature higher than 1200° C. at the first inlet of the second reaction chamber.

6. Apparatus according to claim 1, wherein the at least one second inlet into the second reaction chamber is located, measured from the first inlet, in a first third of a longitudinal dimension of the second reaction chamber.

7. Apparatus according to claim 1, wherein the at least one third inlet into the second reaction chamber is located, measured from the first inlet, in a second half of a longitudinal dimension of the second reaction chamber.

8. Apparatus according to claim 1, wherein a plurality of second and/or third inlets is provided which are spaced at least in a longitudinal direction of the second reaction chamber.

9. Apparatus according to claim 1, comprising at least one heating unit which is adapted to heat the second reaction chamber and is located between the at least one second inlet and the at least one third inlet in a longitudinal dimension of the second reaction chamber.

10. Apparatus according to claim 1, comprising at least one heating unit for heating $CO_2$ or $H_2O$ before injection into the second reaction chamber via the second or third inlets, wherein the heating unit is adapted to heat the respective medium to a temperature of at least 1000° C.

11. Apparatus according to claim 1, wherein the hydrocarbon medium is a gas having the composition $C_nH_m$.

12. Method for operating the apparatus for producing a synthesis gas according to claim 1, the method having the following steps:
    decomposing a hydrocarbon medium into carbon particles and hydrogen in the first reaction chamber with addition of heat by means of a plasma;
    directing at least the carbon particles into the second reaction chamber, the second reaction chamber having the elongated configuration and having the first inlet at one end and the outlet at the opposite end, wherein the first inlet of the second reaction chamber is connected to the outlet of the first reaction chamber, and wherein the second reaction chamber comprises the enlarging flow cross-section between the inlet and the outlet;
    injecting $CO_2$ into the second reaction chamber via the second inlet that is in proximity to the inlet end of the second reaction chamber in order to mix the carbon particles with $CO_2$, wherein the mixture of carbon particles and $CO_2$ initially has a temperature of at least 1000° C.;
    converting a portion of the carbon particles and the $CO_2$ into CO according to the Boudouard reaction;
    injecting $H_2O$ into the second reaction chamber through a third inlet downstream of the second inlet; and
    converting at least a portion of the carbon particles and the $H_2O$ to CO and $H_2$ according to the heterogeneous water gas shift reaction.

13. Method according to claim 12, wherein the carbon particles and the hydrogen generated by the decomposition are supplied conjointly in form of an aerosol and having a temperature of higher than 1200° C. into the second method chamber.

14. Method according to claim 12, wherein the $CO_2$ is injected via the second inlet in the first third of a longitudinal dimension of the second reaction chamber measured from the first inlet.

15. Method according to claim 12, wherein the amount of the injected $CO_2$ is regulated.

16. Method according to claim 12, wherein the $H_2O$ is injected via the third inlet in the second half of a longitudinal dimension of the second reaction chamber measured from the first inlet.

17. Method according to claim 12, wherein the second reaction chamber is actively heated in at least one region that is located between the second inlet and the third inlet in a longitudinal dimension of the second reaction chamber.

18. Method according to claim 12, wherein the second reaction chamber is heated to at least 800° C.

19. Method according to claim 12, wherein at least one of the $CO_2$ and the $H_2O$ is heated to a temperature of at least 1000° C. before injection into the second reaction chamber.

20. Method according to claim 12, wherein the hydrocarbon medium is a gas having the composition $C_nH_m$.

\* \* \* \* \*